A. NUTINI.
GEAR WHEEL.
APPLICATION FILED NOV. 17, 1919.

1,425,042.

Patented Aug. 8, 1922.

Inventor:
Adolfo Nutini
By Lawrence Langner
Attorney.

UNITED STATES PATENT OFFICE.

ADOLFO NUTINI, OF VERONA, ITALY.

GEAR WHEEL.

1,425,042.   Specification of Letters Patent.   Patented Aug. 8, 1922.

Application filed November 17, 1919. Serial No. 338,439.

*To all whom it may concern:*

Be it known that I, ADOLFO NUTINI, a subject of the King of Italy, and resident of Verona, Italy, have invented certain new and useful Improvements in Gear Wheels, of which the following is a specification.

This invention relates to gear wheels of the kind in which the toothed rim is detachably secured to the wheel body and has for its object a construction according to which the wheel body is formed of two or more sections provided with a peripheral groove and the toothed rim is formed of a corresponding number of sections each adapted to enter the groove of a section of the wheel body, these sections being connected together along planes passing through the axis of the wheel.

Figure 1:
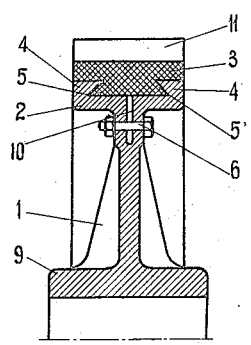
Figure 2:
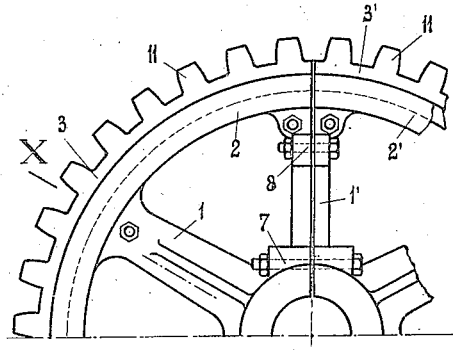

The annexed drawing shows by way of example an embodiment of a gear wheel according to this invention, Figure 1 being a central section of the gear, and Fig. 2 a corresponding fragmentary side view.

In the construction illustrated the wheel body consists of two sections 1—1' adapted to be assembled along a plane passing through the wheel axis by means of bolts 7 and 8, said sections having their rims 2—2' provided with a groove formed by side projections 4—4' and with a radial peripheral slit 10. The toothed rim is also made up of two sections 3—3' provided with a tongue formed by projections 5—5' each section 3 or 3' being attached to the corresponding body section 1 or 1' by fitting the tongue on the said section 3 or 3' in the groove of the body section 1 or 1'.

Said attachment is effected by introducing the end of the rim section 3 or 3' into the groove of the corresponding body section 1 or 1' and by driving said rim section into said groove by causing it to rotate around the wheel axis.

The rim sections 3—3' are then locked or clamped in their respective body sections 1—1' by means of bolts 6 which force projections 4 and 4' against projections 5 and 5', this being allowed by the resiliency imparted to rim 2—2' by the slit 10 provided therein.

The number of sections of the wheel body as well as of the toothed rim may be greater than two and each of said sections may be made in a single piece or consist of parts assembled along planes perpendicular to the wheel axis.

The wheel may be provided with spokes or consist of a solid or perforated disc.

The projections 4—4' and 5—5' may have any desired section, for example semicircular or semi-elliptical section or may comprise several projections and slots and preferably the same are so made as to provide a dove-tail connection.

According to the present invention gear wheels with removable toothed rims may be obtained in which the parts are connected in a very simple and efficient manner, forming wheels of the same strength as integral or solid ones.

What I claim as my invention and desire to secure by United States Letters Patent is:—

A toothed wheel or gear, comprising a wheel body consisting of sections contacting along planes passing through the wheel axis and providing a rim having a pair of inwardly-projecting, peripheral shoulders spaced apart to form a groove between them, the bottom wall of said groove being slit along its median line; a toothed ring consisting of sections inserted endwise into said groove; means for forcing said shoulders against the toothed ring sections so as to clamp them in position; and means for fastening the wheel body sections together in assembled relation.

Signed at Venice, Italy, this 20th day of October, A. D. 1919.

ADOLFO NUTINI.